Patented July 23, 1929.

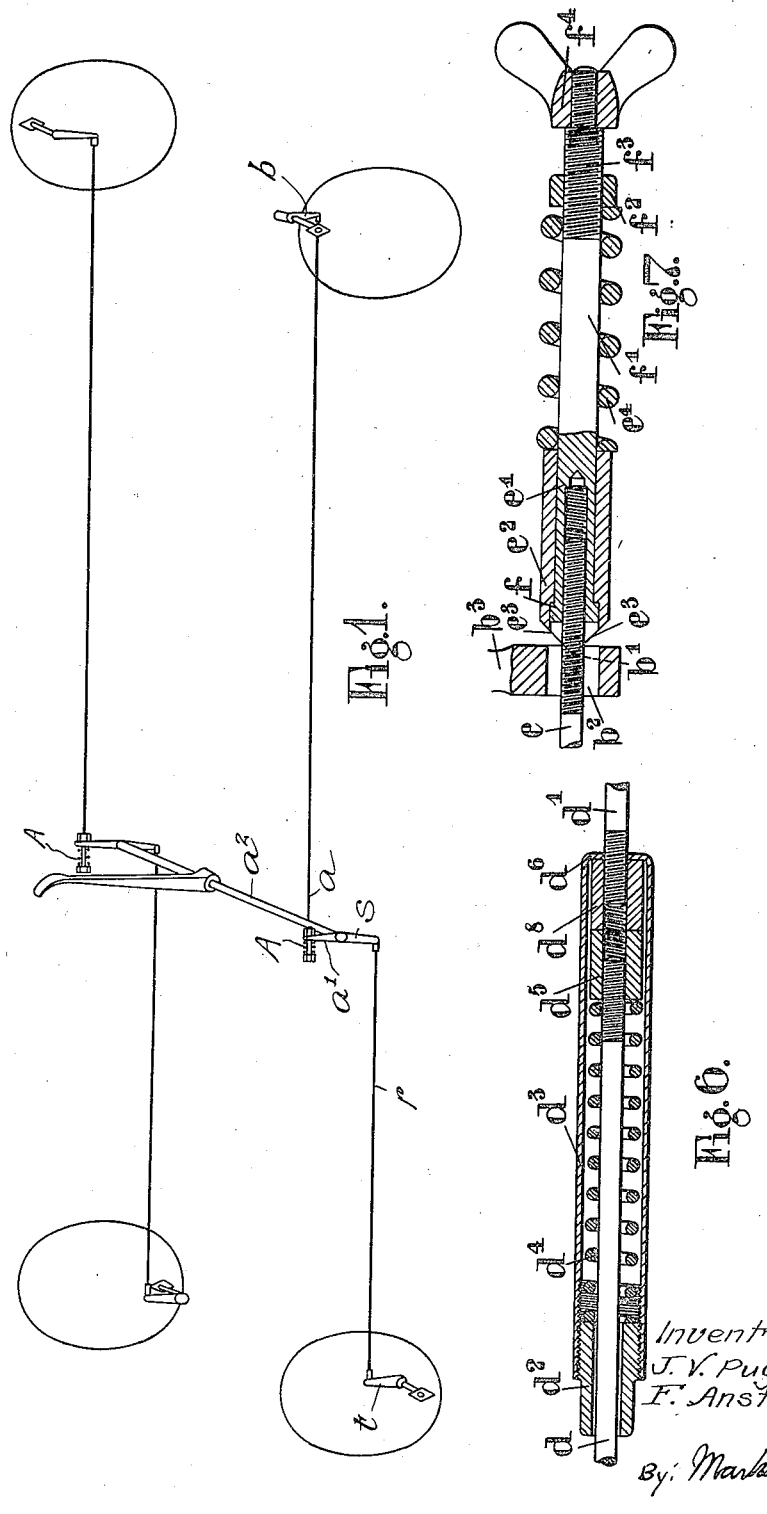

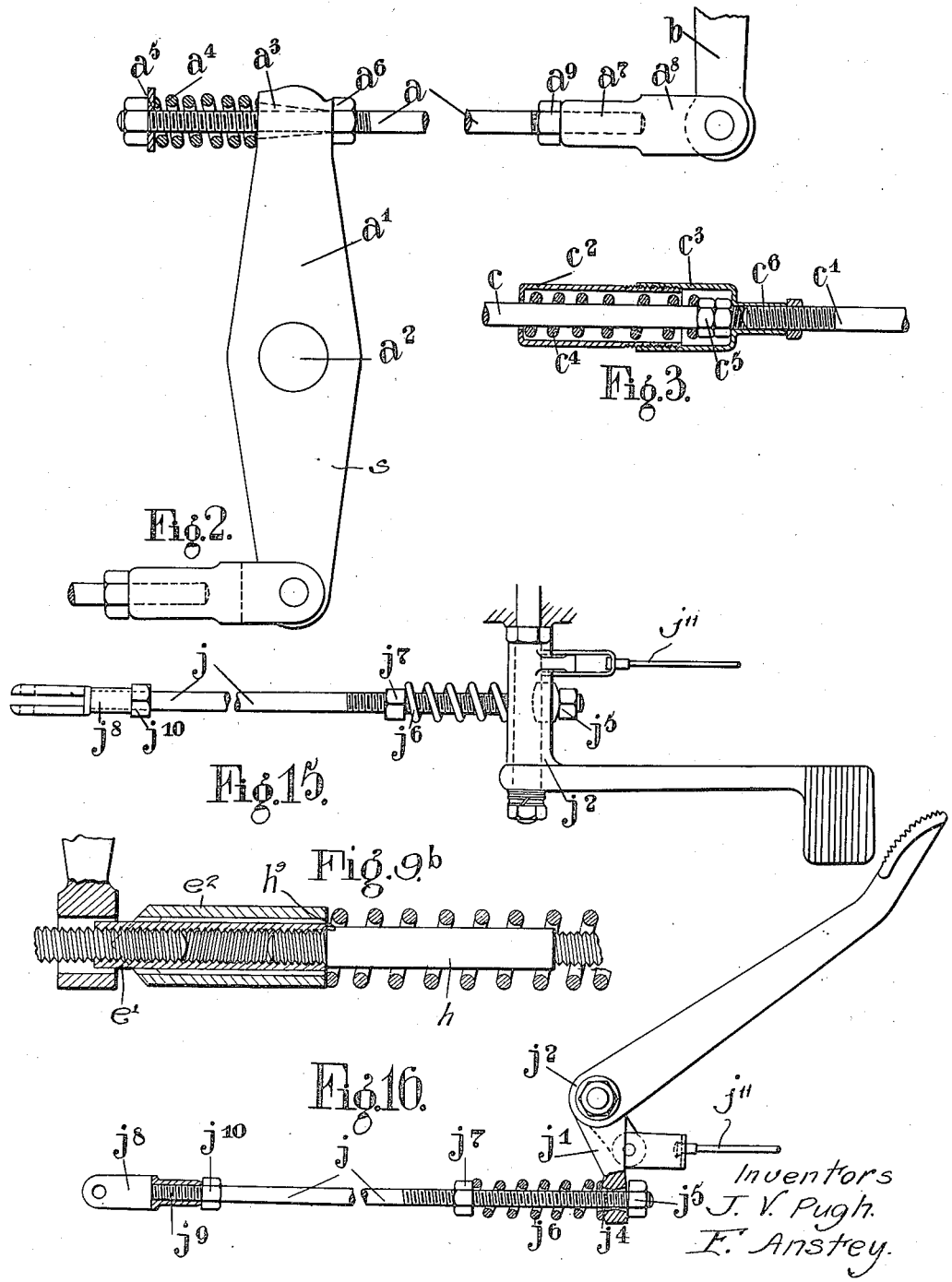

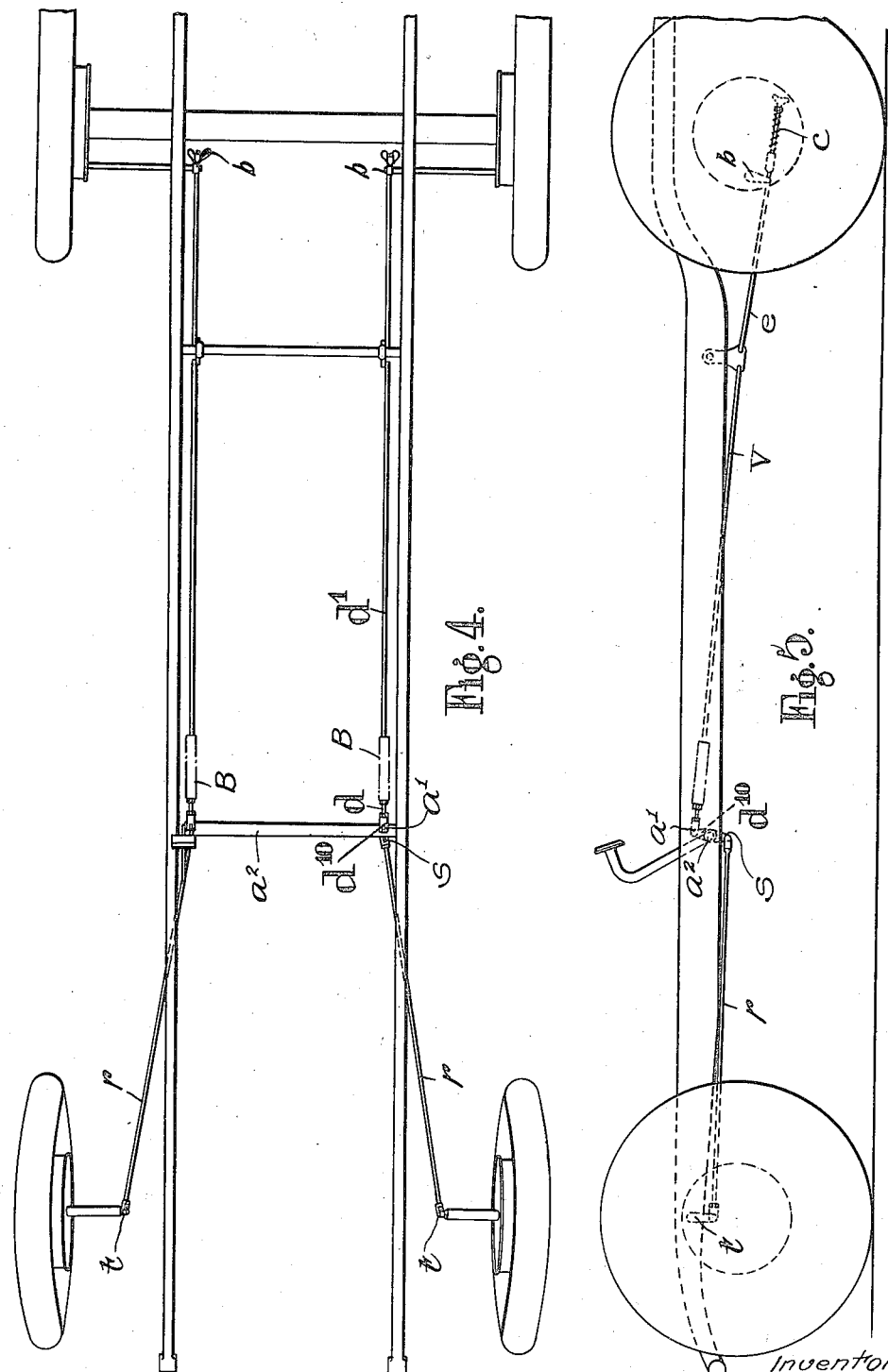

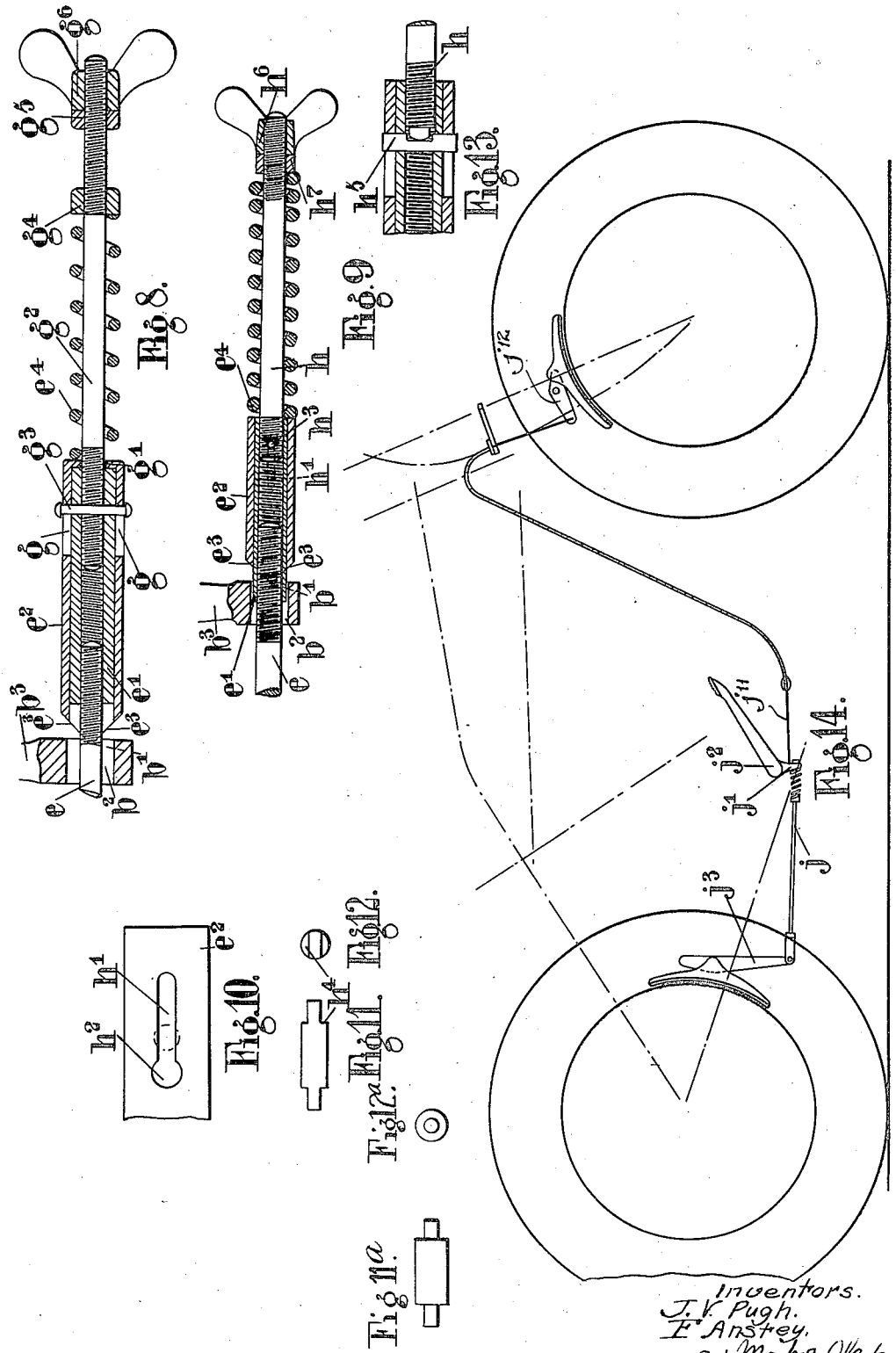

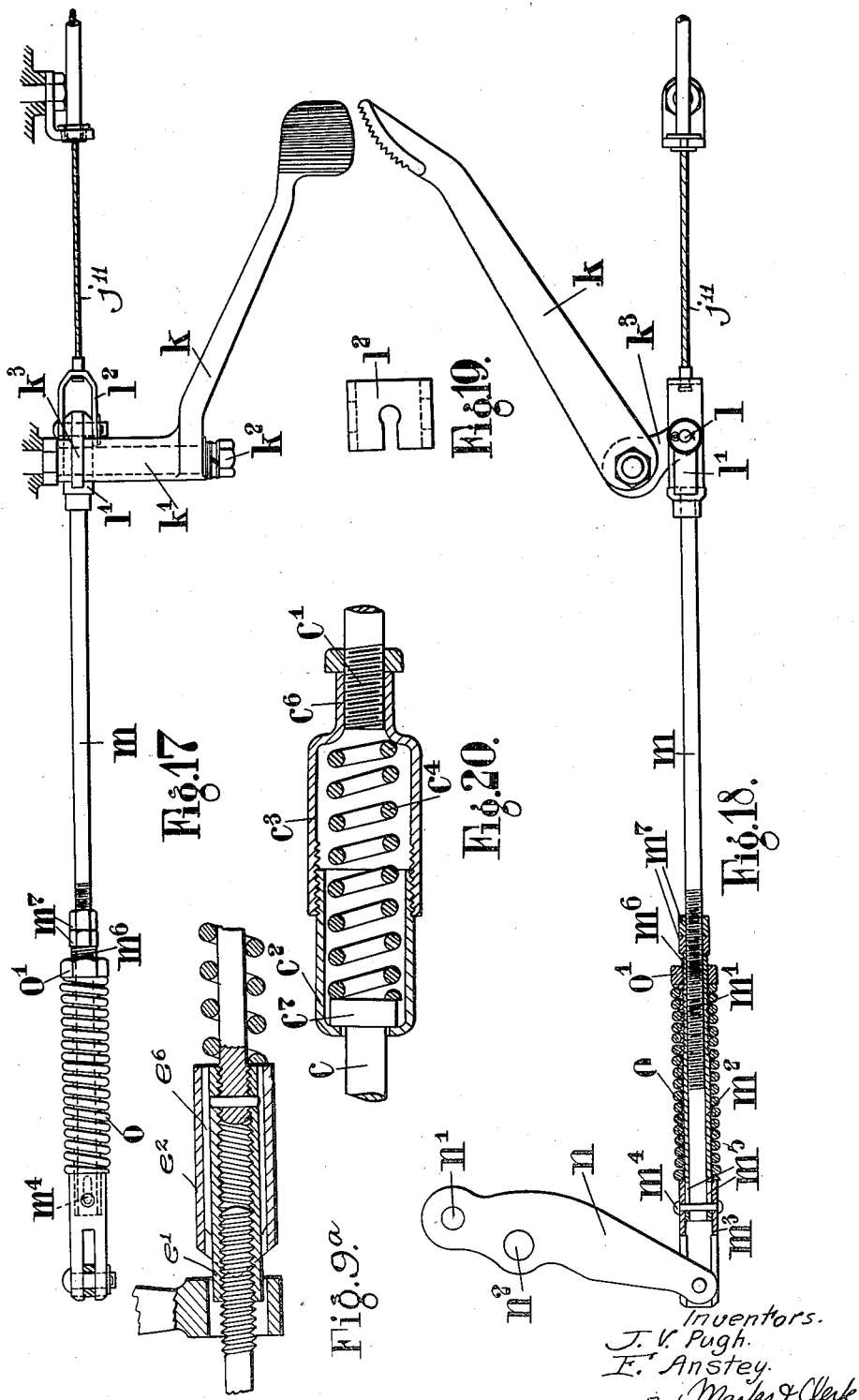

1,722,233

UNITED STATES PATENT OFFICE.

JOHN VERNON PUGH AND FRANK ANSTEY, OF COVENTRY, ENGLAND, ASSIGNORS TO RUDGE-WHITWORTH, LIMITED, OF COVENTRY, ENGLAND.

WHEEL BRAKE FOR VEHICLES.

Application filed July 2, 1926, Serial No. 120,141, and in Great Britain July 20, 1925.

This invention relates to braking gear for vehicle wheels of the kind in which a pedal, hand lever or other power application member is subject to force which is simultaneously transmitted to wheel braking appliances on both the fore and after wheels of a vehicle while continued movement of said member results in certain of the brakes being applied to a greater extent than the others.

The object of the invention is to effect a variation in the proportions of the total power applied which is transmitted to each end in a manner which is to an extent dependent upon the amount of the total application of power.

According to the present invention resilient means capable of being initially stressed to a determined degree are inserted in the transmission line or lines to the back end wheels in a brake gear for transmitting braking power from a common point of application to the brake devices of wheels situated at the forward and after ends of a vehicle so that up to some determined value the steadily increasing braking power applied is apportioned, for example in a substantially equal ratio between the two ends and beyond that value the ratio of apportionment is altered so that the front receives a continually increasing proportion of the total braking power applied.

The invention further consists in a method or apparatus in accordance with either of the preceding paragraphs in combination with brakes fitted to steering wheels in such a manner that the braking effect is modified by the operation of steering the wheels.

The invention further consists in a resilient device adapted to be attached to the end or inserted in the length of a tension element which transmits force from the pedal or other region of application of power to a wheel-braking appliance, said device having adjusting means whereby the value of the force, which for a given movement of the element is exerted upon a member such as a lever arm, may be determined.

The invention further consists in a device for the purpose indicated and comprising a longitudinal member surrounded by a coiled spring initially stressed by adjustment means against a slidable abutment held against the spring by a stop, said abutment coacting with a lever arm or other member to actuate the same for applying a wheel brake.

The invention also consists in improvements in or relating to wheel brakes for vehicles as hereinafter described.

The accompanying drawings show by way of example some ways of carrying the invention into effect.

In these drawings:—

Figure 1 is a diagram indicating the positioning of initially-stressed resilient means before the pedal shaft lever arms in the transmission rodwork of a four-wheel vehicle.

Figure 2 is a detail of the application of resilient means to the pedal shaft lever arms according to Figure 1.

Figure 3 shows resilient means for insertion in the back tension rods of a vehicle.

Figure 4 shows in plan a car chassis with resilient means in position according to Figure 3.

Figure 5 shows an elevation of a chassis like that in Figure 4 but with resilient means positioned behind the brake shaft lever arms.

Figure 6 is another resilient means of the kind shown in Figures 3 and 4.

Figure 7 is another kind of resilient means for use at the end of a rod as in Figure 5.

Figures 8, 9, 9A and 9B are forms differing somewhat from the form shown in Figure 7.

Figures 10, 11, 11A, 12, 12A and 13 show constructive details.

Figure 14 shows the invention applied by way of example to a motor bicycle.

Figures 15 and 16 are details to a larger scale of this arrangement.

Figures 17 and 18 are details of another application to a motor bicycle.

Figure 19 is an end view to a larger scale of the tension stirrup in Figures 17 and 18.

Figure 20 shows another form of spring box.

When making light applications of the brakes to the wheels of a vehicle the best results are obtained by applying the front and back brakes equally because under such conditions the most even wear results and on ice or greasy roads the low coefficients of friction only permit light applications of brakes and the transfer of weight from trailing to leading wheels due to the deceleration is so small that on such slippery surfaces equal or nearly equal application of front and back brakes is desirable.

With a road coefficient of unity or in that neighbourhood the conditions are altered and the front brakes should be somewhere about three times as powerful as the back brakes.

The foregoing is illustrated by the following table taken from the case of a car in which the centre of gravity is assumed to be exactly between front and back wheel and is above the ground by one-quarter of the wheel base.

|  | Front. | Back. | Total. |
|---|---|---|---|
| Coefficient of friction .1 | .0525 w. | .0475 w. | .1 w. |
| " " " .2 | .11 w. | .09 w. | .2 w. |
| " " " .3 | .1725 w. | .1275 w. | .3 w. |
| " " " .4 | .24 w. | .16 w. | .4 w. |
| " " " .5 | .3125 w. | .1875 w. | .5 w. |
| " " " .6 | .39 w. | .21 w. | .6 w. |
| " " " .7 | .4725 w. | .2275 w. | .7 w. |
| " " " .8 | .56 w. | .24 w. | .8 w. |
| " " " .9 | .6525 w. | .2475 w. | .9 w. |
| " " " 1.0 | .751 w. | .251 w. | 1.0 w. |
| " " " 1.1 | .8525 w. | .2475 w. | 1.1 w. |
| " " " 1.2 | .96 w. | .24 w. | 1.2 w. |

According to the present invention a very useful approximation to the foregoing can be obtained by making the front transmission as rigid as reasonably practicable so that the braking effect of front brake or brakes will be closely in proportion to the pressure on the pedal or hand lever.

Into the linkage or transmission for the back brake there is introduced either at A, Figure 1, B, Figure 4, or C, Figure 5, an initially-stressed spring or springs so that for low loads below the predetermined value of the initially-stressed spring the links will act as if no spring were there and the effect on the back brake will be closely in proportion to the pressure on the pedal or hand lever.

Suppose, for example, the initial stress in a spring at A, B, or C is 100 lbs. then up to that compression or force the links will transmit just as if the link were ordinarily rigid and 100 lbs. will go to the front brake and 100 lbs. to back brake due to 200 lbs. resulting from the leverage and force applied to the pedal. If subsequently a force of 300 lbs. is obtained as the result of the pressure applied on the pedal, it may be so proportioned that the pedal movement transmits 190 lbs. in all to front brake, but since the spring now past its initial compression yields, the back brake is only increased to 110 lbs.

Broadly speaking a transmission comprises a rod connecting a lever arm at one end to a lever arm at the other end and a resilient device may be inserted at either end connection between the rod and lever arm as at A, Figure 1 and C, Figure 5 or it may be anywhere in the length of the rod itself as at B, Figure 4, various arrangements being possible for adjusting the length of the rod and initial stress on the resilient device.

In carrying the invention into effect in the convenient form shown at A, Figure 1, and in Figure 2, a rod $a$ connecting an operating arm $a'$ on a pedal lever shaft $a^2$ with a brake shoe applying lever $b$ for a back wheel brake passes through a hole $a^3$ in the end of the operating arm $a'$ so as to be easily slidable therein. A rod $r$ also operates a front wheel brake in any known manner from the arm $s$, for example, by means of the lever $t$.

The rod $a$ operates in tension and the end which passes through the easily-fitting and preferably, as shown, tapering hole $a^3$ in the operating arm $a'$ is extended and a coiled spring $a^4$ is placed upon this extended portion of the rod with a washer and nut $a^5$ adjacent the end for adjusting the force on the spring. A nut or collar $a^6$ is also provided on the rod upon the other side of the operating arm from the spring $a^4$ in order to take the thrust of the spring and render a precompression of the spring possible.

The operative length of the rod $a$ or, in other words, the position of the shoe in relation to the brake drum is adjusted by turning the rod $a$ in the threaded portion $a^7$ of a forked or other eye $a^8$ and securing the adjustment by means of the lock nut $a^9$. In this arrangement, however, the adjustment may also be made by a nut such as $a^6$ if this is used in place of a collar to abut against the operating arm $a'$ and take the thrust of the spring $a^4$.

The force upon the spring is adjusted by the nut and washer $a^5$ at the end of that part of the rod which extends through the operating arm.

The resilient device may be positioned in the rod, for example as shown at B, Figure 4, and in such a construction as shown in Figure 3 a transmission rod $c$, $c'$ operating in tension is provided with a spring box $c^2$, $c^3$ containing a coiled spring $c^4$. The part $c$ of the rod is carried into the spring box through a loosely-fitting aperture at the end of the half $c^2$ of the box and at the other end of the box the rod is provided with a pair of lock nuts or a collar $c^5$ engaging the remote end of the coiled spring $c^4$ which encircles the rod $c$, the other end of the coiled spring abutting against the inside of the end of the half $c^2$ through which the rod enters.

The continuation part $c'$ of the rod $c$, $c'$ is screwed into a tapped orifice $c^6$ formed in the half $c^3$ at the other end of the spring box, the box being conveniently constructed of adjustable length from the two telescoping hollow cylindrical members or halves $c^2$, $c^3$, one of which screws into the other so that the coiled spring may be compressed to any desired amount. After the compression of the spring is regulated by rotation of one half of the box relative to the other, the total length of the transmission line may be regulated by the portion $c'$ of the rod screwing into the orifice or socket $c^6$.

For use on a transmission line acting in compression, the spring box $c^2$, $c^3$ as shown in Figure 20 may be of a similar design to that already described but the rod $c$ which is led in through the loosely-fitting aperture in the part $c^2$ is provided with a collar $c^7$ immediately inside the box which abuts against the end of the coiled spring $c^4$ adjacent thereto. The continuation part $c'$ of the rod is, as in the last example, screwed into the socket $c^6$ of the part $c^3$. Adjustment of the spring is again made by rotation of one half of the box relative to the other and adjustment of the lengths of the transmission lines by screwing the extension part $c'$ of the rod into the tapped orifice $c^6$.

In Figure 6 there is shown another construction of resilient device which may be inserted at B in the length of a tension element this form being suitable for a rod which may not have previously been provided with resilient means, and the rod being cut for this purpose and the two cut ends provided with screw threads of sufficient length for adjusting and upon which are screwed cylindrical or other nuts $d^5$ and $d^8$.

The portion $d$ of the rod which connects to the pedal shaft lever $d^{10}$ is provided with a coiled spring $d^4$ surrounding the rod and abutting against the nut $d^5$ upon the screwed end thereof and this spring together with the two nuts $d^5$ and $d^8$ is accommodated within a hollow cylindrical spring box $d^3$ having at one end an inturned flange $d^6$ which contacts with the remote end of the nut $d^8$ screwed upon the part $d'$ of the rod which is connected to the wheel-braking device. The other end of this cylindrical spring box is provided with a screw thread in which is inserted a plug $d^2$ having a central aperture through which the part $d$ of the rod can easily slide, the screwed plug $d^2$ and spring box $d^3$ being provided externally with engaging means by which they may be turned by spanners or other suitable tools.

This construction may be employed in a brake gear where the joint to the two levers positioned respectively on the pedal shaft and the torsion member of the wheel-braking appliance is an ordinary pin joint. Such arrangements afford no provision for adjusting the overall length of the brake rods since the adjustment of these systems takes place either at another part of the rod or in another part of the total length of the transmission line. It is, however, possible to provide for adjustment in the resilient device by making the nuts $d^5$, $d^8$ which screw upon the threaded ends of the cut tension element long and varying the distance when the two halves of the rod are screwed into them. The two ends of $d$ and $d'$ would be forced back by the spring but the gap between them may be large to start with and then reduced to take up wear by first unscrewing the plug $d^2$ from the end of the cylindrical spring box $d^3$ and sliding the box along to expose the nuts $d^5$, $d^8$ and alter their positions upon the two parts of the tension element, any desirable means for preventing unintentional rotation being provided if required.

Some of the devices hereinbefore described form as explained a convenient means for inserting into an already-existing transmission line by which a lever arm at the end of a torsion element of a wheel-braking appliance is actuated from the brake pedal shaft or other source of application of the braking power a resilient device which is subjected to initial compression, but as such transmission lines frequently take the form of a tension rod having a screw-threaded end which passes through an eye at the free end of a lever arm and applies a force thereto by means of a nut or the like screwed upon the threaded end, another convenient way of carrying the invention into effect and particularly in already-existing brakework is to screw upon the end of the tension rod as shown in Figures 5, 7, 8 and 9, $9^a$, $9^b$ a cylindrical member $e'$ which may be tubular throughout its length or provided at its end only with an aperture, the internal surface being in either case screw threaded to receive the threaded end of the rod $e$.

Slidably mounted upon the cylindrical member is a knife-edge abutment piece $e^2$ which as shown in Figure 7 is retained in position by a collar or enlargement $f$ in the member $e'$ which is recessed below the knife-edge surface of the abutment piece $e^2$, the abutment piece being conveniently formed from a hollow cylinder which has its two opposite sides sliced away as shown at $e^3$ at about an angle of 45° to the axis until they meet upon a diametrical line; the recess is formed in this wedge-shape portion to accommodate the before-mentioned collar $f$ so that the two ends of the diametrical line project as knife edges beyond the end of the cylindrical member to engage a V-shaped groove $b'$ cut across the back of the eye $b^2$ in a brake-applying lever arm $b^3$ through which the tension rod $e$ passes.

Surrounding the rearwardly-extending part $f'$ of the cylindrical member $e'$ behind the slidable abutment piece $e^2$ is a coiled compression spring $e^4$ which at its other end contacts with adjustment means in the form of a nut $f^2$ screwed upon a threaded portion $f^3$. Beyond this threaded portion the cylindrical member is provided with a wing turning head $f^4$ or other rotating means attached thereto in such a manner that the cylindrical member may be rotated thereby.

In applying this device, the threaded aperture of the cylindrical member $e'$ is screwed upon the end of the tension rod $e$ with the knife edges engaging the recess $b'$ in the back of the lever arm $b^3$ and when this has been done the adjusting nut $f^2$ is screwed up to contact with the end of the coiled spring $e^4$ and subjects this spring to any desired compression so that sliding movement of the abutment is prevented until some predetermined force is exerted thereon.

When the predetermined force is exceeded the actual force imparted to the end of the lever arm $b^3$ and consequently the gripping force exerted on the brake will be related to the total compression of the spring $e^4$ so that any definite movement of the brake pedal may be caused to exert some corresponding determined gripping force on the wheel.

In another form of the device shown in Figure 8 the slidable abutment $e^2$ is formed as a tube having the sides cut away at $e^3$ to an angle in order to form knife edges at each side thereof and having a slot $g$ upon each side adjacent the other end for a desirable portion of the length of the tube.

At the opposite end to the cut-away sides, the edge of the tube $e^2$ is turned inward to make an internal flange $g'$ and fitting within the tube and retained therein by the said internal flange is the cylindrical member $e'$ in the form of a long cylindrical nut adapted to slide within the tube and to screw upon the end of the tension rod $e$.

Into the other or back end of the cylindrical nut $e'$ is screwed a rod $g^2$; this rod passes through the aperture of the inturned flange $g'$ and is prevented from rotation in the nut $e'$ by a pin $g^3$ passing transversely through the nut and rod and projecting upon each side of the nut so that it may slide in the slot $g$ formed in the tubular abutment member $e^2$.

The screwed rod $g^2$ is surrounded by a coiled spring $e^4$, one end of which abuts against the outer face of the inturned flange $g'$ and the other end of which is engaged by a nut $g^4$ screwed upon a threaded region at the other end of the rod $g^2$. Behind this nut there is, at the end of the threaded region, a wing nut $g^6$ also screwed upon the rod and locked in position by co-operation with another nut $g^5$.

An alternative to the foregoing is shown at Figure 9 and in this construction the tube $e^2$ forming the slidable abutment and having the sides cut away at $e^3$ to form knife edges on each side is bored parallel throughout its length and provided with a cylindrical nut $e'$ in the form of an inner tube telescoping or sliding therein. This inner tube is provided throughout its length with an internal screw thread; the back end of the nut $e'$ is flush with the back of the slidable abutment tube $e^2$ and the front end projects beyond the knife edges and enters the aperture $b^2$ in the lever arm $b^3$.

This construction provides considerable latitude for adjustment, the tension rod $e$ being screwed into the one end and a screwed rod $h$ carrying a coiled spring $e^4$, as in the construction last described, being screwed into the opposite end.

The screwed rod $h$ may be locked in the cylindrical nut $e'$ by a pin $h^3$ passing through both the rod and nut as previously described and the slidable abutment $e^2$ is then conveniently provided with slots $h'$ in which the ends of the pin engage.

The pin $h^3$ may be of a larger diameter than the normal width of the slots $h'$ and the slots as shown in Figure 10 be provided at their inner end with buttonholes $h^2$ large enough for the pin to pass through, the pin being provided with flats $h^4$ at each end as shown in Figures 11 and 12 to form the portion adapted to slide in the slots. Alternatively the pin may be shouldered down to a smaller diameter at each end as shown in Figures $11^a$ and $12^a$ in order to slide in the slots or, as another alternative, shown in Figure 13, the pin $h^5$ may have a central notch against which the end of the screwed rod $h$ abuts in order to form a stop for the rod and retaining means for the pin. In a case in which the pin does not engage slots in the abutment $e^2$ rotation of the nut in the abutment may be prevented by employing splines $e^6$ as shown in Fiure $9^a$ or other means.

In another form the screwed rod, such as $h$, may be provided with a shoulder $h^9$ as shown in Figure $9^b$ for screwing hard against the end of the cylindrical nut. The coiled spring $e^4$ upon the screwed rod $h$ may press against the ends of both the cylindrical nut $e'$ and the tubular sliding abutment $e^2$ and in any case the screwed rod $h$ will be provided with a nut $h^7$ for adjusting the initial compression of the spring and a second fly-nut $h^8$ or the like which is locked up against it for turning the whole device round for the purpose of adjusting the brake shoe clearance.

A device with only two nuts $h^6$, $h^7$ at the end of the screwed rod $h$ is screwed upon the end of the tension member $e$ of the brake gear in the same manner as the device previously described, the wing nut $h^6$ and the nut $h^7$ adjacent thereto being locked together for this purpose and when the device is in its proper position on the tension rod and with the knife edges of the tubular abutment $e^2$ engaging the groove $b'$ in the back of the lever arm $b^3$, the nut $h^7$ may be screwed up to contact with the end of the coiled spring $e^4$ and subject the same to any desired compression.

The application of the invention to motor cycles is shown in Figures 14 to 19 and in Figures 14, 15 and 16 a compression rod $j$ connecting an operating arm $j'$ on a foot lever shaft or boss $j^2$ with a brake shoe applying lever $j^3$ passes through a hole $j^4$ in the end of the operating arm $j'$ so as to be easily slidable therein and is provided at that end with a nut $j^5$ screwed upon the rod.

Encircling the rod $j$ and abutting against the other side of the operating arm from the nut $j^5$ is a coiled spring $j^6$, the other end of which is engaged by an adjusting nut $j^7$ screwed upon a thread formed on the rod $j$.

The rod engages the brake shoe applying lever $j^3$ by means of a forked eye $j^8$ which is provided with a threaded aperture $j^9$ into which the rod $j$ is screwed, the rod being provided with a lock nut $j^{10}$ for abutting against the end of the eye $j^8$ and locking it in any position of adjustment. The front brake is moved by a Bowden wire $j^{11}$ without any stressed resilient means.

In the arrangement for applying the invention to a motor cycle shown in Figures 17, 18 and 19, the pedal lever $k$ has its boss $k'$ mounted upon the stud $k^2$ and provided with a single operating arm $k^3$.

The arm carries at its end a pin $l$ passing through a fork eye $l'$ and also the tension stirrup $l^2$ which is connected with the Bowden wire for operating the front wheel brake. The fork eye $l'$ is screwed upon the end of a compression rod $m$ having a long threaded portion $m'$ at its other end which enters a tube $m^2$ slidably mounted in a tubular fork eye $m^3$, the tube being retained in the eye by a pin $m^4$ fitting tightly in the eye and working in slots $m^5$ cut in the end of the tube. The fork eye $m^3$ is connected to the lever $n$ which is pivoted at $n'$ and to which the rear wheel brake shoe is connected at $n^2$. Upon the tube $m^2$ is mounted a compression spring $o$ pressing at one end against the tubular portion of the fork eye $m^3$ and at its other end against a nut $o'$ screwed upon a threaded portion $m^6$ at the end of the tube $m^2$. The rod $n$ is also provided with two lock nuts $m^7$ which may be located in any position abutting against the end of the tube $m^2$. In this construction the desired initial compression is applied to the spring $o$ by means of the nut $o'$ and the total length of the rod which regulates the brake clearance is regulated by means of the two lock nuts $m^7$.

It will be seen that the constructions hereinbefore described may be employed for any kind of vehicle such as a bicycle, a motor bicycle, motor car or the like and in the case of a vehicle having brakes upon wheels which are steered, the steering gear may be of the type described in British Specification No. 219,419 where the steering of the wheels modifies the effect of the brakes upon opposite sides of the car so that redistribution of all the force acting on the brakes will result from steering.

The constructions already described and in which a coiled spring is employed as the stressed resilient means represent only one method of carrying the invention into effect and any other devices may be employed in which a resilient element may be placed in any desired state of initial stress. Springs acting in tension instead of in compression as in the described constructions may also be employed if desired.

The described forms indicate only certain ways in which the invention may be carried into effect and additions and modifications may be introduced without in any way departing from the spirit of this invention.

Having now described our invention, what we claim as new and desire to secure by Letters Patent is:—

1. A front and rear wheel vehicle brake gear comprising in combination brake-applying means for one or more wheels at the front of a vehicle, brake-applying means for one or more wheels at the rear thereof, members movable from a source of power to actuate all said brake-applying means, substantially non-resilient transmission means connecting some of said members to the front brake-applying means, transmission means extending from other of said members to the rear brake-applying means and resilient means initially stressed to a predetermined amount inserted in the last-mentioned transmission means so that up to a predetermined force the distribution of braking power between front and rear wheels is unaffected while beyond that force the resilient device controls distribution so that a front wheel receives more than a rear.

2. A vehicle wheel-braking gear comprising in combination brake-applying means for a wheel at the front of a vehicle, brake-applying means for one at the rear thereof, means movable to actuate both said brake-applying means, substantially non-resilient transmission means connecting said movable means to the front brake-applying means, transmission means connecting said movable means to the rear brake-applying means and initially stressed resilient means inserted in said last-named transmission means.

3. A vehicle wheel-braking gear comprising in combination brake-applying means for the front and for the back wheels of a vehicle, members movable to actuate the same, transmission means connecting the front brake-applying means with said members, pivoted arms on the back brake-applying means, tension rods from said members projecting through apertures in said arms, guide pieces axially adjustable on the projecting rod ends, stop means on said guides, sliders on said guides abutting against said arms, and resilient means adjusted to a desired initial stress pressing said sliders against the stop means.

4. A vehicle wheel-braking gear comprising in combination brake-applying means for the front and for the back wheels of a vehicle, members movable to actuate the same, transmission means connecting the front brake-applying means with said members, rods from said members with ends extending through lever arms on the back brake-applying means, guide pieces axially adjustable on the rod ends, stop means on said guides, sliders on said guides abutting against said arms, and initially stressed resilient means pressing said sliders in the direction of said arms until arrested by the stop means.

5. A vehicle wheel-braking gear comprising in combination brake-applying means for the front and for the back wheels of a vehicle, members movable to actuate the same, substantially non-resilient transmission means connecting the front brake-applying means with said members, lever arms on the back brake-applying means, tension rods extending from said members to the back brake-applying means and projecting at one of their ends through apertures in lever arms, and initially stressed resilient means carried by the rod end and transmitting the rod tensions to the lever arms.

6. A vehicle wheel-braking gear comprising in combination retarding means for the front and for the back wheels of a vehicle, conjointly movable front and back transmission actuating means, substantially non-resilient transmission means connecting the front retarding means to the actuating means, an applying member for a back wheel retarding means, resilient means transmitting force from the back transmission actuating member to said applying member and being stressed thereby, means preventing movement of one of said last-mentioned members relative to the other due to the stress in said resilient means, means for adjusting the relative positions of said members and means for imposing an initial stress upon said resilient means.

7. A vehicle wheel-braking gear comprising in combination retarding means for a wheel at the front of a vehicle, retarding means for one at the rear thereof, means movable to actuate both said retarding means, transmission means connecting said movable means to the front retarding means, a longitudinal member in cooperation with said movable means, a coiled spring surrounding said longitudinal member, a slidable abutment in contact with said spring, a stop for said abutment, adjustment means for stressing said spring against said abutment, and means whereby said spring actuates the back wheel retarding means.

8. A vehicle wheel-braking gear comprising in combination retarding means for a wheel at the front of a vehicle, retarding means for one at the rear thereof, a transverse shaft, means for applying a torque thereto, lever arms projecting from said shaft, substantially non-resilient transmission means connecting one lever arm to said front wheel retarding means, an initially stressed resilient device, means connecting another lever arm to said device and means connecting said device to said back wheel retarding means.

9. A vehicle wheel-braking gear comprising in combination retarding means for a wheel at the front of a vehicle, retarding means for one at the rear thereof, a transverse shaft, means for applying a torque thereto, lever arms projecting from said shaft, transmission means connecting one lever arm to said front wheel retarding means, pivoted arms on the back brake-applying means, tension rods from another lever arm projecting through an aperture in said pivoted arm, a guide piece axially adjustable on the projecting rod end, stop means on said guide, a slider on said guide abutting against said pivoted arm and resilient means adjustable to a desired initial stress pressing said slider against stop means.

10. A vehicle wheel-braking gear comprising in combination retarding means for a brake drum attached to a wheel at the front of a vehicle, equivalent means for one at the rear thereof, a lever operating each of said retarding means, members jointly movable to actuate both said levers, substantially non-resilient transmission means connecting one of said members to the lever for the front wheel, transmission means connecting another of said members to the rear wheel lever and initially stressed resilient means transmitting force from one part to another of said last-named transmission means.

11. A vehicle wheel braking gear comprising brake-applying means each having lever arms for the front and for the rear wheels of a vehicle, actuating arms movable to exert force thereon, substantially non-resilient transmission means extending from a front brake arm to an actuating arm, transmission rods extending from an actuating arm to a back brake arm and projecting through an aperture in at least one arm, resilient means carried by a transmission rod and subjected to force transmitted thereby and means for imposing an initial stress on said resilient means.

12. A vehicle wheel braking gear comprising brake-applying means each having lever arms for the front and for the rear wheels of a vehicle, actuating arms movable to exert force thereon, transmission means extending from a front brake arm to an actuating arm, a tension rod from an actuating arm projecting through an aperture in a back brake arm, a rearwardly projecting guide piece upon the projecting rod end, a tube slidable on said guide projecting forward to engage said back brake arm and engaging the rear of said guide, a member extending rearwardly from said guide through said tube end, a coil spring upon said member, adjusting means on said member to compress said spring against said tube end and means for axially adjusting said guide on said projecting rod end.

13. A vehicle wheel braking gear comprising in combination retarding means for a wheel at the front of a vehicle, retarding means for one at the rear thereof, a transverse shaft, means for applying a torque thereto, lever arms projecting from said shaft, transmission means connecting one lever arm to said front wheel retarding means, pivoted arms on the back brake-applying means, tension rods from another lever arm projecting through an aperture in said pivoted arm, a rearwardly projecting guide piece upon the projecting rod end, a tube slidable on said guide projecting forward to engage said back brake arm and engaging the rear of said guide, a member extending rearwardly from said guide through said tube end, a coil spring upon said member, adjusting means on said member to compress said spring against said tube end and means for axially adjusting said guide on said projecting rod end.

In testimony whereof we have signed our names to this specification.

JOHN VERNON PUGH.
FRANK ANSTEY.